United States Patent
Machida et al.

(10) Patent No.: US 8,427,811 B2
(45) Date of Patent: Apr. 23, 2013

(54) ELECTRODE FOR ELECTRIC DOUBLE LAYER CAPACITOR AND METHOD FOR PRODUCING THE SAME

(75) Inventors: Kenji Machida, Tokyo (JP); Shunzo Suematsu, Tokyo (JP); Kenji Tamamitsu, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 176 days.

(21) Appl. No.: 12/679,470

(22) PCT Filed: Sep. 29, 2008

(86) PCT No.: PCT/JP2008/002721
§ 371 (c)(1),
(2), (4) Date: Jun. 30, 2010

(87) PCT Pub. No.: WO2009/041076
PCT Pub. Date: Apr. 2, 2009

(65) Prior Publication Data
US 2010/0259867 A1 Oct. 14, 2010

(30) Foreign Application Priority Data

Sep. 28, 2007 (JP) ................................. 2007-256173
Mar. 28, 2008 (JP) ................................. 2008-086002

(51) Int. Cl.
*H01G 9/00* (2006.01)
(52) U.S. Cl.
USPC ........... 361/502; 361/503; 361/504; 361/512; 361/517; 361/509

(58) Field of Classification Search .................. 361/502, 361/503–504, 509, 512, 516, 517, 525, 528–529
See application file for complete search history.

(56) References Cited

U.S. PATENT DOCUMENTS 7,466,539 B2 * 12/2008 Dementiev et al. ........... 361/502
2002/0122985 A1 * 9/2002 Sato et al. ..................... 429/232
(Continued)

FOREIGN PATENT DOCUMENTS

EP 1 583 169 10/2005
JP 2002-064038 2/2002
(Continued)

OTHER PUBLICATIONS

European Application No. 08834321.5 Extended European Search Report dated Jun. 8, 2012, 5 pages.

(Continued)

*Primary Examiner* — Nguyen T Ha

(57) ABSTRACT

An electrical double-layer capacitor electrode with excellent capacitance characteristics is obtained together with a manufacturing method therefor. Paper-molded sheet 2 of carbon nanotubes is integrated with etched foil 1 constituting a collector, by means of bumps and indentations 1a formed on the surface of etched foil 1 to prepare an electrical double-layer capacitor electrode. Alternatively, carbon nanotubes 4 grown around core catalyst particles on substrate 3 are integrated with etched foil 1 by means of bumps and indentations 1a formed on the surface of etched foil 1 to prepare an electrical double-layer capacitor electrode. To manufacture these electrodes, this carbon nanotube sheet 2 or substrate 3 with carbon nanotubes grown thereon is laid over bumps and indentations 1a on the surface of etched foil 1, and the sheet or substrate and the foil are pressed under 0.01 to 100 t/cm2 of pressure to integrate the carbon nanotubes with the etched foil.

9 Claims, 7 Drawing Sheets

U.S. PATENT DOCUMENTS

| | | |
|---|---|---|
| 2005/0220989 A1 | 10/2005 | Chaturvedi et al. |
| 2008/0013258 A1 | 1/2008 | Viswanathan et al. |
| 2009/0168301 A1 | 7/2009 | Viswanathan et al. |

FOREIGN PATENT DOCUMENTS

| | | |
|---|---|---|
| JP | 2004-127737 | 4/2004 |
| JP | 2005-190721 | 7/2005 |
| JP | 2005-294832 | 10/2005 |
| WO | 2007/047185 | 4/2007 |

OTHER PUBLICATIONS

Japanese Patent Application No. 2008-086002 Office Action dated Jan. 22, 2013, 6 pages including English translation.

* cited by examiner

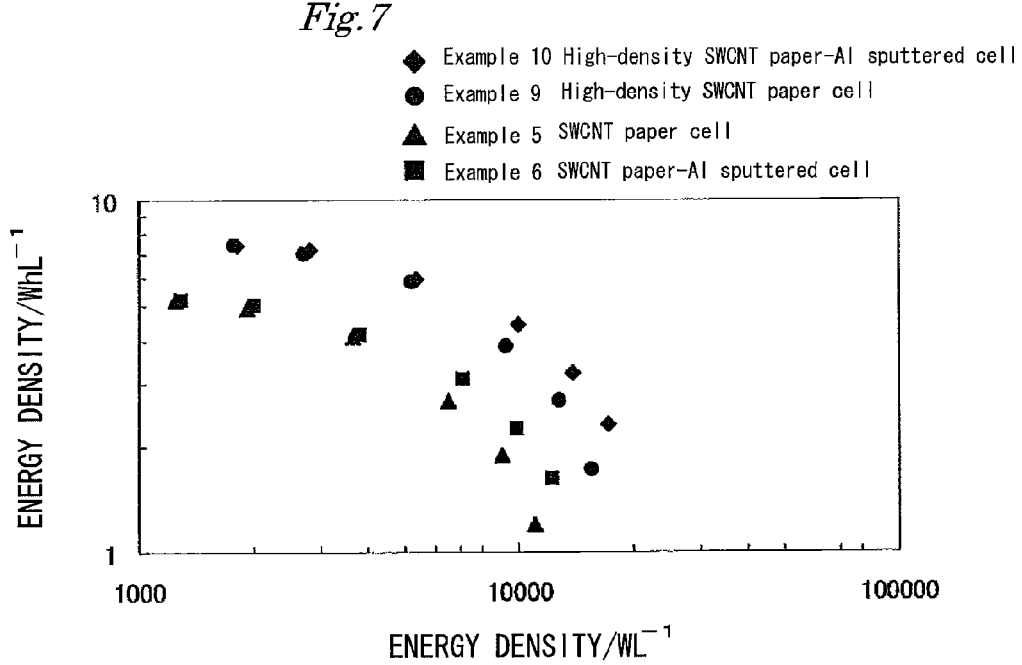

ELECTRODE FOR ELECTRIC DOUBLE LAYER CAPACITOR AND METHOD FOR PRODUCING THE SAME

TECHNICAL FIELD

The present invention relates to an electrical double layer capacitor electrode that has been improved so as to provide excellent capacitance characteristics, and to a manufacturing method therefor.

BACKGROUND ART

An electrical double layer capacitor has active carbon or other polarizable electrodes as the positive and negative electrodes, and an electrolyte solution consisting of a quaternary onium salt of boron tetrafluoride or phosphorus hexafluoride dissolved in an organic solvent such as propylene carbonate. In such an electrical double layer capacitor, the electrostatic capacity is the electrical double layer at the boundary between the electrode surface and the electrolyte solution, with the advantage that since there is no reaction involving ions as in a battery, the charge-discharge characteristics are good, and there is little capacity deterioration attributable to the charge-discharge cycle.

Consequently, electrical double layer capacitors are indispensable for example in storage systems for fuel cell automobiles and hybrid automobiles for example, and especially in regenerative energy storage systems, which collect the energy that is dissipated during breaking. However, double layer capacity provides lower energy densities than batteries, making it inadequate as a power source for electrical automobiles, so there is a need for further improvements in storage capacity density.

This electrical double layer capacitor comprises an electrode formed with an electrical double layer, in other words a polarizable electrode, an electrolyte solution, a separator passing only ions of the electrolyte, and a collecting electrode for collecting and removing charge from the polarizable electrode, and is configured as a cell with the electrolyte solution sealed in a structure consisting of a pair of polarizable electrodes having collecting electrodes on their reverse faces which are arranged facing each other with a separator between the two.

Various proposals have been made for such electrical double layer capacitors with the aim of providing an electrical double layer capacitor having a large storage capacity. In one example, carbon nanotubes were used as the polarizable material of an electrical double layer capacitor (Patent Document 1).

However, the problem with the invention described in Patent Document 1 above is that an electrode with good capacitance characteristics cannot be obtained because a resin component is used for the binder.

To improve on this, one proposal is to attach and bond conductive fibers or conductive tubes to an electrode substrate roughly parallel to the longitudinal direction of the electrode substrate without using a binder, conductive auxiliary material or the like, as shown in Patent Document 2. However, in the invention of this Patent Document 2 conductive fibers or conductive tubes are attached and bonded to an electrode substrate by an electrodeposition method such as electrophoresis, and complex and time-consuming operations are required for attaching and binding to the electrode substrate, such as agitating a solution of dispersed conductive fibers or conductive tubes in an organic solvent with ultrasound.

Patent Document 1: Japanese Patent Application Laid-open No. 2005-136020
Patent Document 2: Japanese Patent Application Laid-open No. 2006-222175

DISCLOSURE OF THE INVENTION

It is an object of the present invention, which is proposed in order to resolve the aforementioned problems of prior art, to provide an electrical double layer capacitor electrode with excellent capacitance characteristics that can be manufactured by simple operations in comparison with the invention of Patent Document 2, along with a manufacturing method therefor.

In an effort to resolve these problems, the inventors in this case perfected the present invention as a result of much investigation into electrical double layer capacitor electrodes capable of providing excellent capacitance characteristic using carbon nanotubes as the polarizable material of an electrical double layer capacitor.

That is, in the electrical double layer capacitor electrode of the present invention carbon nanotubes are paper molded into a sheet, which is then integrated with a substrate constituting a collector, by means of bumps and indentations on the surface of the substrate. One mode of the present invention also features an electrical double layer capacitor electrode using a porous metal body as the substrate, and an electrical double layer capacitor electrode using nickel foam or aluminum as this substrate.

The electrical double layer capacitor electrode of the present invention also features a sheet of paper molded carbon nanotubes, which is integrated with an etched foil constituting a collector by means of bumps and indentations formed on the surface of the etched foil. One mode of the present invention is an electrical double layer capacitor electrode in which carbon nanotubes grown around core catalyst particles on a substrate are integrated with an etched foil by means of bumps and indentations formed on the surface of the etched foil.

In one mode of the electrical double layer capacitor electrode of the present invention, the sheet of paper molded carbon nanotubes is a carbon nanotube aggregate with a density of 0.5 to 1.5 g/cm$^3$ produced by depositing carbon nanotubes with high dispersion.

One mode of the present invention is an electrical double layer capacitor electrode manufacturing method in which, in order to form these electrodes, the aforementioned carbon nanotube sheet or substrate with grown carbon nanotubes is laid over the bumps and indentations on the surface of an etched foil, and the sheet or substrate and the foil are pressed to integrate the carbon nanotubes with the etched foil.

In one mode of the present invention, a small amount of a resin or other binder or a conductive auxiliary material or the like can be used to prevent dissipation of the carbon nanotubes when the carbon nanotubes are paper molded. Even in this case the capacitance characteristics can still be greatly improved to the extent that the amount of binder is much less than the amount required when using a binder to integrate carbon nanotubes with a collector.

Another mode of the present invention is an electrical double layer capacitor electrode having aluminum sputtered on at least the surface of the collector side of the sheet prior to integration.

With the present invention having the configuration described above, because the carbon nanotubes and etched foil of the collector are integrated with the bumps and indentations of the etched foil worked into the carbon nanotubes, the conductive material contacts the collector directly without the need for a resin or other binder or conductive auxiliary or other material, thereby reducing electrical resistance and providing an electrical double layer capacitor electrode with excellent capacitance characteristics.

This applies not only to etched foils but also when the collector is a substrate having bumps and indentations on the surface, especially a nickel foam or other porous metal body, and if a porous metal body is used in particular the apparent density is reduced by the hollows inside the metal body, resulting in a lighter collector and making it possible to obtain an electrical double layer capacitor electrode with excellent capacitance characteristics. Using nickel foam in particular, it is possible to obtain an electrical double layer capacitor electrode with excellent capacitance characteristics and having an apparent density of 0.2 g/cc (porosity 98%) which is lighter than that of an etched foil (about 1.0 g/cc minimum in the case of an Al etched foil).

An electrical double layer capacitor electrode with even better electrical characteristics can be obtained by using for the paper molded sheet of carbon nanotubes a carbon nanotube aggregate with a density of 0.5 to 1.5 g/cm$^3$ obtained by using ultrahigh-pressure treatment to break up bundles and macro-aggregations of CNTs and so that the CNTs are deposited with high dispersion.

BRIEF DESCRIPTION OF THE DRAWINGS

FIG. 7 is a graph of the energy density and power density relationships in Example 9, Example 10, Example 5 and Example 6 of the Examples of the present invention.

Figure 1:
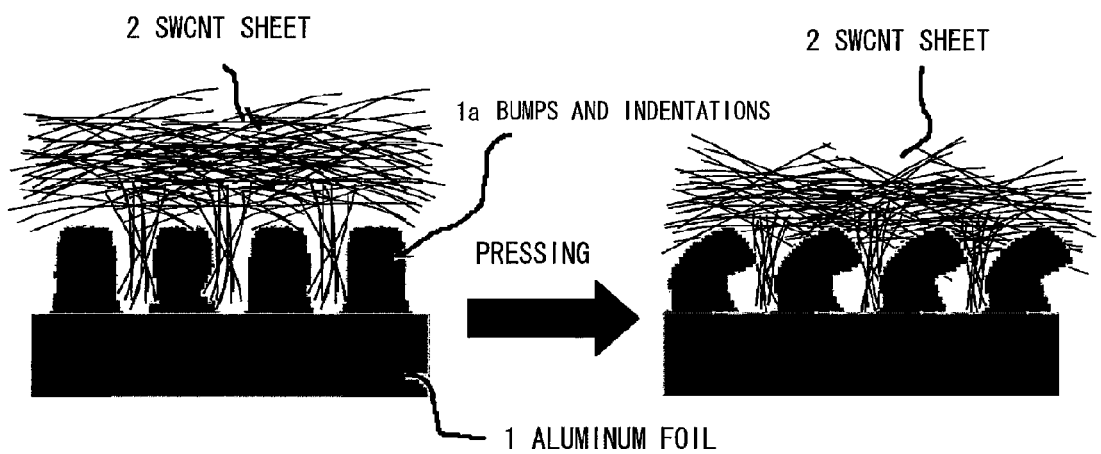
FIG. 1 is a cross-section showing a model view of one example of the electrical double layer capacitor electrode manufacturing method of the present invention.

BEST MODE FOR CARRYING OUT THE INVENTION (1) Electrical Double Layer Capacitor Electrode Manufacturing Methods (1-1) First Method (FIG. 1)

Generally speaking, in this method an electrode is manufactured by paper molding (paper making) carbon nanotubes (hereunder abbreviated as CNTs) without a binder to form a CNT sheet (also called paper), and pressing this CNT sheet 2 against a collector foil such as etched aluminum foil 1 (also called etched foil 1) to integrate CNT sheet 2 with etched foil 1.

In more detail, a specific amount of single-walled carbon nanotubes (hereunder abbreviated as SWCNTs) is measured out, mixed with a specific amount of methanol, and agitated for about 30 seconds in a common mixer to prepare a methanol dispersion of SWCNTs. This dispersion is filtered under reduced pressure with PTFE filter paper (diameter 35 mm, average pore size 0.2 μm) to obtain a paper molded SWCNT sheet. The thickness of this SWCNT sheet 2 takes into consideration the deformation caused by pressing so as to obtain a thickness of about 1 to 60 μm of the carbon nanotube layer formed after pressing (more specifically, the required thickness of a carbon nanotube layer for the electrode of an electrical double-layer capacitor).

This SWCNT sheet 2 is cut to the same size as the collector and placed over etched aluminum foil 1 serving as the collector, a separately prepared aluminum foil (not shown) with a flat, unetched surface is laid on top, and pressing is performed for 1 minute with 10 t/cm$^2$ of pressure from above and below the foils.

The pressure during pressing is preferably 0.01 to 100 t/cm$^2$. This exerts pressure on bumps and indentations 1a on the enlarged surface of etched aluminum foil 1, with the result that, as shown in FIG. 1, the bumps and indentations bend under the pressure, and the bumps push into paper molded SWCNT sheet 2, contributing superior bonding properties.

Figure 2:
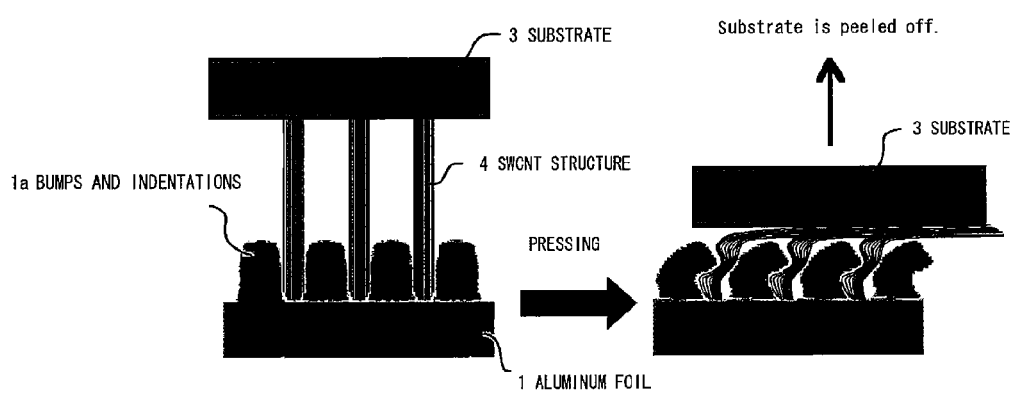
FIG. 2 is a cross-section showing a model view of another example of the electrical double layer capacitor electrode manufacturing method of the present invention.

(1-2) Second Method (FIG. 2)

Generally speaking, in this method metal fine particles such as iron fine particles or cobalt fine particles are set as a catalyst on the surface of a silicon substrate or other substrate 3, CNTs are grown from this catalyst to form SWCNT structures 4, and these SWCNT structures 4 are pressed together with specific etched foil 1 to prepare an electrode.

In more detail, etched aluminum foil 1, which is a collector of the same size as substrate 3, is placed on SWCNT structures 4 grown on substrate 3 by a known CVD (chemical vapor deposition) method, and these are sandwiched with a separately prepared aluminum foil (not shown) having a smooth surface and pressed for 1 minute at 10 t/cm$^2$ pressure from above and below foils. After pressing the smooth aluminum foil is removed, and the collector (etched foil 1), which was affixed to substrate 3 by pressing, is peeled off to transfer SWCNT structures 4 to the surface of the collector.

In this second method, the pressure during pressing is preferably 0.01 to 100 t/cm$^2$. This exerts pressure on bumps and indentations 1a on the enlarged surface of the etched aluminum foil, with the result that the bumps bend under the pressure and push into SWCNT structures 4, conferring superior bonding properties.

(1-3) Pressing Method

In addition to flat pressing, roll pressing and other methods can be used as the pressing method as long as 0.01 to 100 t/cm$^2$ of pressure is applied.

(2) Etched Foil

An aluminum foil or other metal foil collector having the surface area enlarged by chemical etching or electrochemical etching can be used as this etched foil 1. In this case, the thickness of the etched foil of the collector is preferably 10 μm to 100 μm. Below 10 μm a capacitor cell structure is hard to achieve because the collector is too weak, while if the foil is to thick the capacity density (or energy density) per cell will be reduced.

The bumps and indentations 1a formed on etched foil 1 are preferably shaped in such a way that the tips of the bumps push into the sheet during pressing, or deform and become entwined with the fibers of the sheet, so bumps and indentations 1a are preferably formed more in the shape of pointed rods (needles) rather than gentle bumps.

The height of bumps and indentations 1a (distance between the tips of the bumps and the bottoms of the indentations) should also be less than the thickness of the carbon nanotube layer (which is about 1 to 60 μm for example), and is set so that the collector is thoroughly covered by the carbon nanotube layer formed after pressing. The thickness (about 10 μm to 100 μm) of the etched foil of the collector also needs to be considered, and from the standpoint of maintaining the strength of the etched foil, it is desirable in the case of a thin etched foil that the height be no more than ⅔ of the thickness of the foil.

(3) High-density Carbon Nanotube Aggregate

A carbon nanotube aggregate with a density of 0.5 to 1.5 g/cm$^3$ (high-density carbon nanotube aggregate) formed when the carbon nanotubes making up the paper molded carbon nanotube sheet of the present invention are deposited with high dispersion can be obtained as follows.

A specific quantity of CNTs (single-walled CNTs or multi-walled CNTs) are mixed with a specific quantity of isopropyl alcohol and agitated with a homogenizer to obtain a dispersed solution. This dispersed solution is introduced into a specific metal chamber and subjected to ultrahigh pressure of 100 to 280 MPa. The highly dispersed solution obtained by this ultrahigh pressure treatment is filtered under reduced pressure with PTFE filter paper (di. 35 mm, average pore size 0.2 μm) to obtain a paper molded sheet. This sheet is then further flattened under 0.01 to 100 t/cm$^2$ of pressure to obtain a high-density sheet (high-density CNT sheet).

A high-density CNT sheet obtained as described above was laid over the bumps and indentations on the surface of an etched foil, and pressed to integrate the CNTs with the etched foil and obtain an electrical double layer capacitor electrode. A sheet paper molded as described above was also laid over the bumps and indentations on the surface of an etched foil without being flattened first, and these were to integrate the CNTs with the etched foil, thus performing densification and integration in the same process.

In this Description, a "high-density carbon nanotube aggregate" is a carbon nanotube aggregate with a density of 0.5 to 1.5 g/cm$^3$ obtained by depositing carbon nanotubes in a highly dispersed state, while a "high-density carbon nanotube sheet" is a sheet obtained from such a high-density carbon nanotube aggregate. In some cases a "high-density carbon nanotube sheet" is also called "high-density carbon nanotube paper".

(3-1) Ultrahigh Pressure Treatment

In ultrahigh pressure treatment, a dispersed solution obtained as described above is introduced into a specific metal chamber and subjected to ultrahigh pressure of 100 to 280 MPa. A slit-type chamber, ball impact chamber or the like can be used as the metal chamber.

When ultrahigh pressure is applied in this way, the dispersed solution impacts with high energy either the wall surfaces of the metal chamber, slits installed in the metal chamber or balls introduced into the metal chamber or the like to thereby break up bundles and macro-aggregations of carbon nanotubes, resulting in high dispersion. Bundles and macro-aggregations are also broken up and high dispersion is achieved because the solution is mixed at high energy with itself as the result of the ultrahigh pressure.

(3-2) Flattening

Flattening is performed using a roll press that flattens between two rollers, or a vertical press that exerts parallel pressure from above and below or the like, and the pressing pressure is preferably 0.01 to 100 t/cm$^2$. This is because if the pressure is too weak high density cannot be achieved, while too high pressure produces defects in the CNT sheet.

EXAMPLES

[1. Examples Using Etched Foil]

Example 1

About 50 mg of single-walled carbon nanotubes (SWCNTs) were measured, mixed with 50 ml of methanol, and agitated for about 30 seconds in an ordinary mixer to obtain a dispersion of SWCNT and methanol. This dispersion was filtered under reduced pressure with PTFE filter paper (di. 35 mm, average pore size 0.2 μm) to obtain paper molded SWCNT sheets. These were cut to the same size as the collectors, laid over etched aluminum foil, unetched aluminum foil, copper foil and platinum foil collectors, sandwiched with aluminum foil, and pressed for 1 minute under 10 t/cm$^2$ of pressure from above and below the foils.

Example 2

Etched aluminum foil, unetched aluminum foil, copper foil and platinum foil were laid separately as collectors the same size as the substrate over SWCNT structures grown on substrates by CVD, and pressed with high pressure under the same conditions as in Example 1. After pressing, the sandwiched aluminum foils were removed, and the collectors affixed to the substrates by pressing were peeled off to transfer the SWCNT structures to the surfaces of the collectors.

Comparative Example 1

About 50 mg of SWCNTs were measured, mixed with about 10 mg of binder (PTFE) dispersion and about 10 mg of Ketjen black as a conductive auxiliary, and kneaded with a pestle. This was then stretched with a biaxial roller to obtain a single-walled CNT sheet.

(Test Results)

Adhesion immediately after high-pressure pressing and adhesion after immersion in methanol following high-pressure pressing were observed with respect to Examples 1 and 2 above, with the results shown in Table 1. As shown in Table 1, adhesion was better using the etched foil of the present invention than using the other collectors.

TABLE 1

| | | Collector | | | | | | | |
|---|---|---|---|---|---|---|---|---|---|
| | | | | | | | | Aluminum foil | |
| | | Platinum foil | | Copper foil | | Etched foil | | Unetched (plain) foil | |
| | | a | b | a | b | a | b | a | b |
| Ex. 1 | SWCNT paper | ○ | X | X | — | ○ | ○ | ○ | X |
| Ex. 2 | SWCNT structures | ○ | X | ○ | X | ○ | ○ | X | — | a: Adhesion immediately after high-pressure pressing (○: good, X: poor)
b: Adhesion after immersion in methanol following high-pressure pressing (○: adhesion maintained, X: peeling)

When the capacity density of electrodes of the present invention having etched foils attached as collectors by high-pressure pressing was measured in Examples 1 and 2 and Comparative Example 1, the capacity density was about 20 to 30% higher in the electrodes of Examples 1 and 2 than in Comparative Example 1. This is thought to be because the binder in Comparative Example 1 inhibits improvement in capacity density.

[2. Examples Using Nickel Foam]

In the previous examples etched foil was used as the substrate with bumps and indentations on the surface constituting the collector, but nickel foam and other porous metal bodies can also be used as substrates, and additional findings regarding design and effects are explained below.

Example 3

Pressing was performed as in Example 1 using a SWCNT sheet paper molded by the same methods as in Example 1 and a collector made of nickel foam, which is a porous metal body with a porosity of 98% and a density of 0.18 g/cm$^3$ (Sumitomo Electric Industries Celmet (trademark) in this example).

Example 4

Transfer was accomplished as in Example 2 using the same Celmet with a porosity of 98% and a density of 0.18 g/cm$^3$ for the collector together with SWCNT structures similar to those of Example 2.

(Test Results)

Adhesion immediately after high-pressure treatment and adhesion after immersion in methanol following high-pressure treatment were observed with respect to Examples 3 and 4, with the results shown in Table 2.

TABLE 2

|  |  | Collector Celmet (nickel foam) | |
| --- | --- | --- | --- |
|  |  | a | b |
| Example 3 | SWCNT paper | ○ | ○ |
| Example 4 | SWCNT structures | ○ | ○ | a: Adhesion immediately after high-pressure treatment (○: good, X: poor)
b: Adhesion after immersion in methanol following high-pressure treatment (○: adhesion maintained, X: peeling)

As shown in Table 2, adhesion is as good using a metal foam in the present invention as it is using the etched foil shown in Table 1.

[3. Reduction in Resistance]

In terms of contact resistance after bonding, contact resistance was lower with either a SWCNT paper electrode (Example 1) or SWCNT structure electrode (Example 2) obtained by pressing an etched aluminum foil than it was with an active carbon electrode having a similar etched aluminum foil attached with carbon paste. Resistance was equivalent to that of the active carbon electrode, however, when voltage was not applied. This is explained in detail below.

Comparative Example 2

A SWCNT sheet paper molded by the same methods as in Example 1 was sandwiched between aluminum foils without a collector, pressed for 1 minute under 10 t/cm$^2$ of pressure from above and below the foils, and cut to the same size as the collector. Using the same etched aluminum foil as in Example 1 as the collector, carbon paste was applied to the surface for attaching the aforementioned cut SWCNT sheet, and the high-pressure treated SWCNT sheet was attached to the top of the foil and dried for one hour at 120° C. at ordinary pressure to obtain an electrode (SWCNT paper pasted electrode).

(Test Results)

The results shown in Table 3 were obtained when the electrical resistance of the electrodes of Example 1 and Comparative Example 2 was measured by the AC impedance method. The same values were also obtained when Example 2 was compared with Comparative Example 2.

TABLE 3

|  | Example 1 SWCNT paper pressed electrode | Comparative Example 2 SWCNT paper pasted electrode |
| --- | --- | --- |
| Electrical resistance | 0.6 Ω | 6.0 Ω |

As shown in Table 3, the electrode of Example 1, which was prepared by the high-pressure method of the present invention, had 1/10 the resistance value of the electrode bonded with carbon paste of Comparative Example 2. This is thought to be because in comparison to the electrode of Comparative Example 2, the electrode of Example 1 lacks the resistance component of the carbon paste layer and the resistance component of the boundary contact between the carbon paste and the SWCNTs.

[4. Improvement in Power Density]

When the energy density and power density of a laminated cell using the electrode of Example 1 above were evaluated, the contact resistance was found to be low while the power density was high. Resistance was also lower than in an active carbon electrode when voltage was applied. This is explained in detail below.

Example 5

An electrical double layer capacitor element (electrode surface area 2.1 cm$^2$) was prepared using the electrode (SWCNT paper electrode) prepared in Example 1 for both electrodes, with a cellulose separator between the two. The element was then impregnated with an electrolyte solution consisting of a propylene carbonate solution containing 1 M (=1 mol/dm$^3$) of tetraethylammonium tetrafluoroborate, and heat sealed with a laminate film to prepare a cell for evaluation (SWCNT paper cell).

Comparative Example 3

About 50 mg of steam-activated active charcoal for an electrical double layer capacitor was measured out, mixed with a roughly 10 mg binder (PTFE) dispersion and about 10 mg of Ketjen black as a conductive auxiliary, and kneaded in a mortar. This was then stretched with a biaxial roller to obtain an active carbon sheet. The resulting sheet was then pasted with ordinary carbon paste to the etched aluminum foil used in Example 1 to obtain an active carbon electrode. This active carbon electrode was cut to the same surface area as the SWCNT paper electrode of Example 5, and a cell for evaluation (active carbon cell) was prepared by the same methods as in Example 5.

(Test Results)

The contact resistance, electron movement resistance and ion diffusion resistance of the cells of Example 5 and Comparative Example 3 above were measured by the electrochemical AC impedance method with the results shown in Table 4.

TABLE 4

|  | Example 5 SWCNT paper cell | Comparative Example 3 Active carbon cell |
|---|---|---|
| Rct | 0.2 Ω | 0.5 Ω |
| Re | 0.9 Ω | 1.4 Ω |
| W | 1.1 Ω | 1.4 Ω |

Rct: Contact resistance
Re: Electron movement resistance
W: Ion diffusion resistance As shown in Table 4, in comparison with the active carbon cell the SWCNT paper cell using etched foil of the present invention had lower resistance components in the three categories of contact resistance, electron movement resistance and ion diffusion resistance, and contact resistance in particular was about 60% lower than in the active carbon cell.

Figure 3:
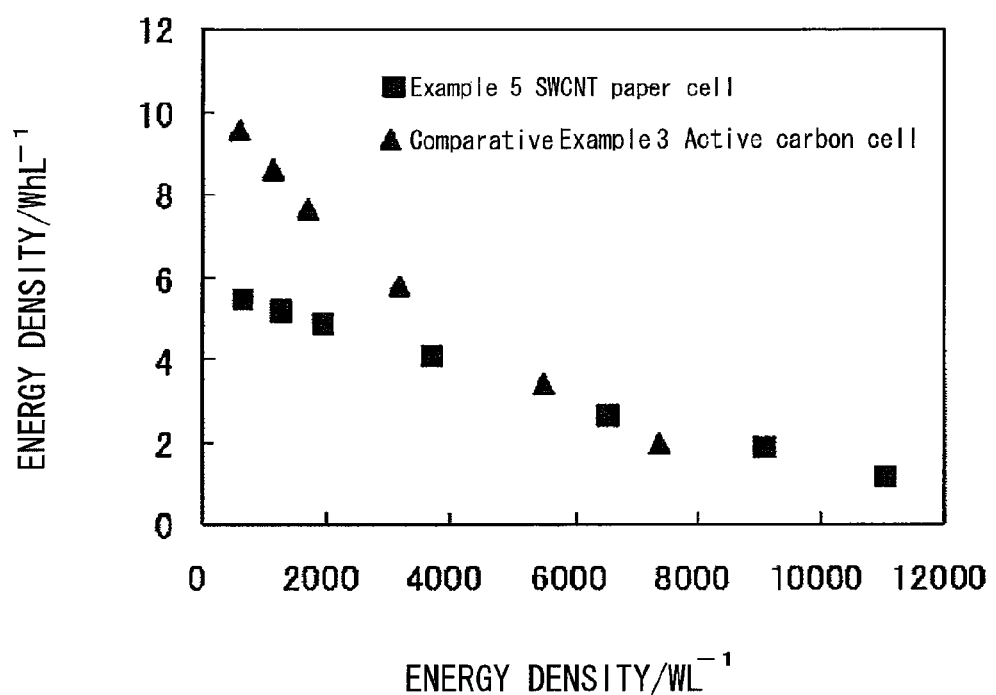
FIG. 3 is a graph of the energy density and power density relationships in Example 5 and Comparative Example 3 of the Examples of the present invention.

The results shown in FIG. 3 were obtained when the energy density and power density of the cells of Example 5 and Comparative Example 3 above were measured. As shown in FIG. 3, the cell of Example 5 had a more gradual plot line than the cell of Comparative Example 3, indicating that it could maintain a high energy density even in the high power density range. This is attributed to the greater capacity retention of the cell due to the three resistance components, which were all smaller in the cell of Example 5 than in the cell of Comparative Example 3 as shown in Table 4.

[5. Reduction in Resistance from Sputtering]

It was also found that the resistance value of the resulting electrode could be reduced by sputtering a metal such as Al, Au or Pt on the SWCNT paper or structures before press bonding in the present invention. This is explained in detail below.

Example 6

Aluminum was sputtered by magnetron sputtering on one side of a SWCNT sheet paper molded by the same method as in Example 1. With the sputtered surface as the contact surface with the collector, and using an etched aluminum foil as the collector as in Example 1, pressing was performed as in Example 1 to obtain an electrode (SWCNT paper-Al sputtered electrode). A cell for evaluation (SWCNT paper-Al sputtered cell) was prepared as in Example 5 using this electrode for both electrodes.

(Test Results)

When contact resistance, electron movement resistance and ion diffusion resistance were measured by the electrochemical AC impedance method using the cells of Example 5 and Example 6 above, the results were as shown in Table 5.

TABLE 5

|  | Example 5 SWCNT paper cell | Example 6 SWCNT paper-Al sputtered cell |
|---|---|---|
| Rct | 0.2 Ω | BMDV* |
| Re | 0.9 Ω | 0.6 Ω |
| W | 1.1 Ω | 1.1 Ω |

Rct: Contact resistance
Re: Electron movement resistance
W: Ion diffusion resistance
*Below minimum detection value As shown in Table 5, contact resistance was greatly reduced with the cell of Example 6 in particular.

Figure 4:
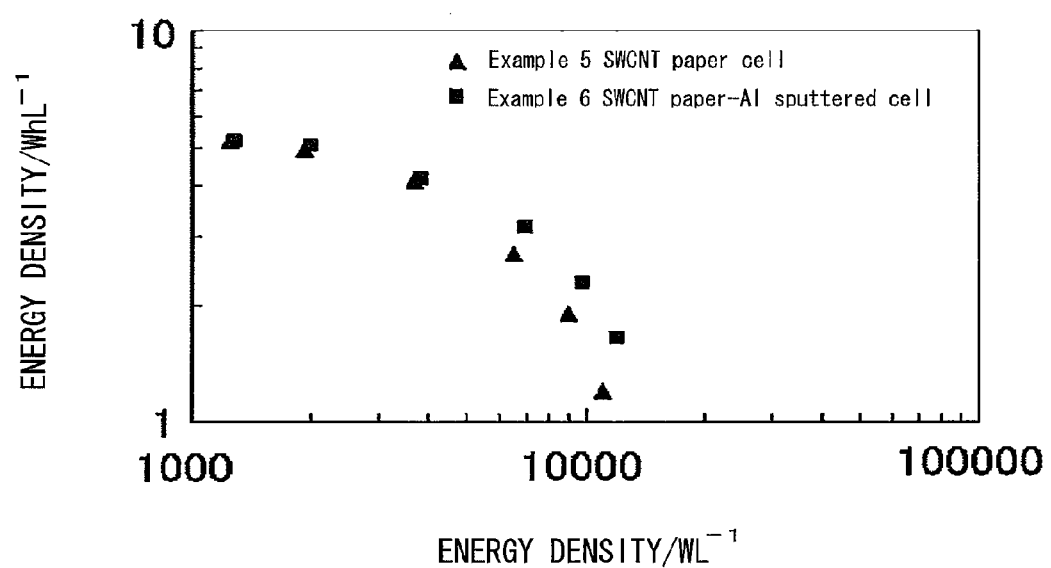
FIG. 4 is a graph of the energy density and power density relationships in Example 5 and Example 6 of the Examples of the present invention.

The energy density and power density of the cells of Example 5 and Example 6 were measured with the results shown in FIG. 4. As shown in FIG. 4, the cell of Example 6 retained greater energy density even at the high power density range than the cell of Example 5. It is believed that the cell of Example 6 shown in Table 5 had higher capacity retention because it had lower contact resistance than the cell of Example 5.

[6. Improvement in Power Density]

Next, when the energy density and power density of a laminated cell using the electrode of Example 2 above were evaluated, the power density was found to be high, with contact resistance, electron movement resistance and ion diffusion resistance even lower than in Example 5 above. This is explained in detail below.

Example 7

Transfer was performed as in Example 2 using the same SWCNT structures as in Example 2 and etched aluminum foil similar to that of Example 2 as the collector to prepare electrodes (SWCNT structure electrodes). Using these for both electrodes, a cell for evaluation (SWCNT structure cell) was prepared by the same methods as in Example 5.

(Test Results)

When the contact resistance, electron movement resistance and ion diffusion resistance were measured by the electrochemical AC impedance method using the cells of Example 5 and Example 7 above, the results were as shown in Table 6.

TABLE 6

|  | Example 5 SWCNT paper cell | Example 7 SWCNT structure cell |
|---|---|---|
| Rct | 0.2 Ω | 0.1 Ω |
| Re | 0.9 Ω | 0.7 Ω |
| W | 1.1 Ω | 0.9 Ω |

Rct: Contact resistance
Re: Electron movement resistance
W: Ion diffusion resistance As shown in Table 6, the cell of Example 7 had lower resistance values than that of Example 5 in the three areas of contact resistance, electron movement resistance, and ion diffusion resistance, and contact resistance in particular was reduced by about 50%.

The SWCNT structures used in the cell of Example 7 had a smoother contact surface with the collector than the SWCNT paper used in the cell of Example 5, as well as structures with the SWCNTs arranged regularly in one direction (strong orientation). It is believed that contact resistance is reduced due to the smoothness of the SWCNT structures, while electron movement resistance is reduced due to the large number of points of contact between SWCNTs in the highly oriented SWCNT structures. Moreover, it is thought that ion diffusion resistance is reduced because ion diffusion is also enhanced by the high orientation.

Figure 5:
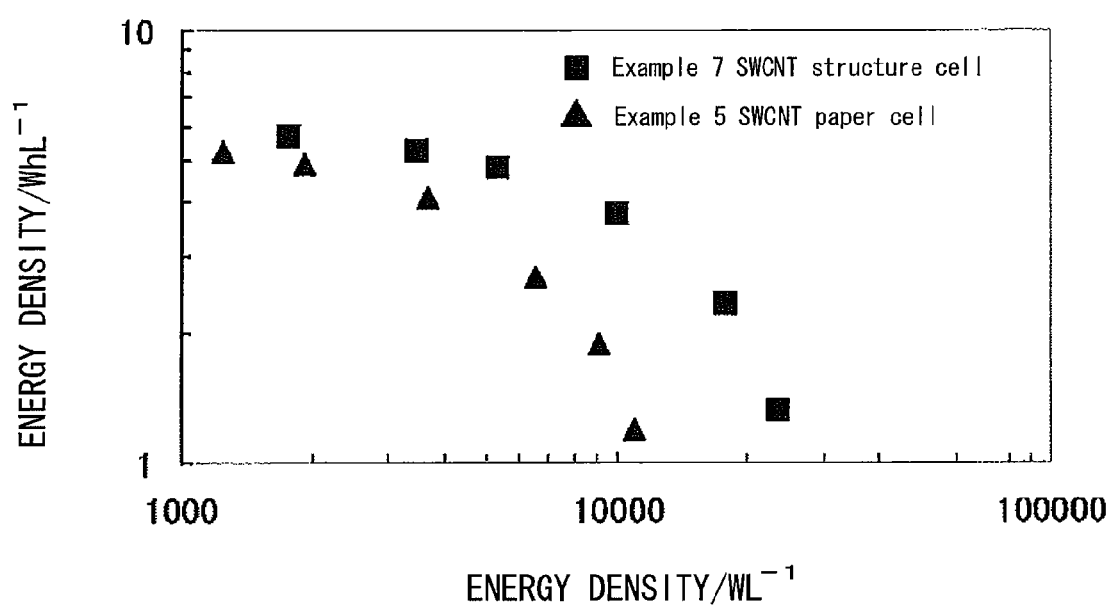
FIG. 5 is a graph of the energy density and power density relationships in Example 5 and Example 7 of the Examples of the present invention.

The energy density and power density of the cells of Example 5 and Example 7 were measured with the results shown in FIG. 5. As shown in FIG. 5, the cell of Example 7 maintained greater energy density even at a high power density range than with the cell of Example 5. This is attributed to higher capacity retention by the cell because the three types of resistance were lower in the cell of Example 7 than in the cell of Example 5 as shown in Table 6.

[7. Examples Using High-density SWCNT Sheets]

It was found that a carbon nanotube electrode obtained by press bonding an etched aluminum foil with a high-density carbon nanotube sheet obtained by paper molding following ultrahigh pressure treatment of the carbon nanotubes had high energy density and power density. This is explained in detail below.

Example 8

100 mg of the same SWCNTs as in Example 1 were mixed in 1 L of isopropyl alcohol, and agitated for about 2 minutes with an ordinary mixer to obtain a dispersed solution. This dispersed solution was introduced into a specific metal chamber and subjected to 200 MPa of ultrahigh pressure, and the resulting highly dispersed solution was filtered under reduced pressure with PTFE filter paper (di. 35 mm, average pore size 0.2 μm) to obtain a paper molded sheet. This sheet was dried under reduced pressure for 3 hours at 60° C. The resulting sheet was press bonded by the same methods as in Example 1 to a similar aluminum foil (high-density SWCNT paper electrode).

(Test Results)

The sheet density, sheet density after press bonding and sheet density after electrolyte impregnation of the high-density SWCNT sheet prepared in Example 8 above and the SWCNT sheet prepared in Example 1 were investigated, with the results shown in Table 7. As shown in Table 7, the high-density SWCNT sheet obtained in Example 8 exhibited higher sheet density than the SWCNT sheet obtained in Example 1. The sheet density after press bonding and after electrolyte impregnation was also much higher than in Example 1, showing that a high-density SWCNT sheet had been obtained.

TABLE 7

| | Sheet density g/cm$^3$ | Sheet density after press bonding g/cm$^3$ | Sheet density after press bonding following electrolyte impregnation g/cm$^3$ |
|---|---|---|---|
| Example 1 | 0.26 | 1.13 | 0.81 |
| Example 8 | 0.61 | 1.32 | 1.15 |

Example 9

A laminated cell for evaluation (high-density SWCNT paper cell) was prepared as in Example 5 using the high-density SWCNT paper electrode prepared in Example 8.

(Test Results)

Figure 6:
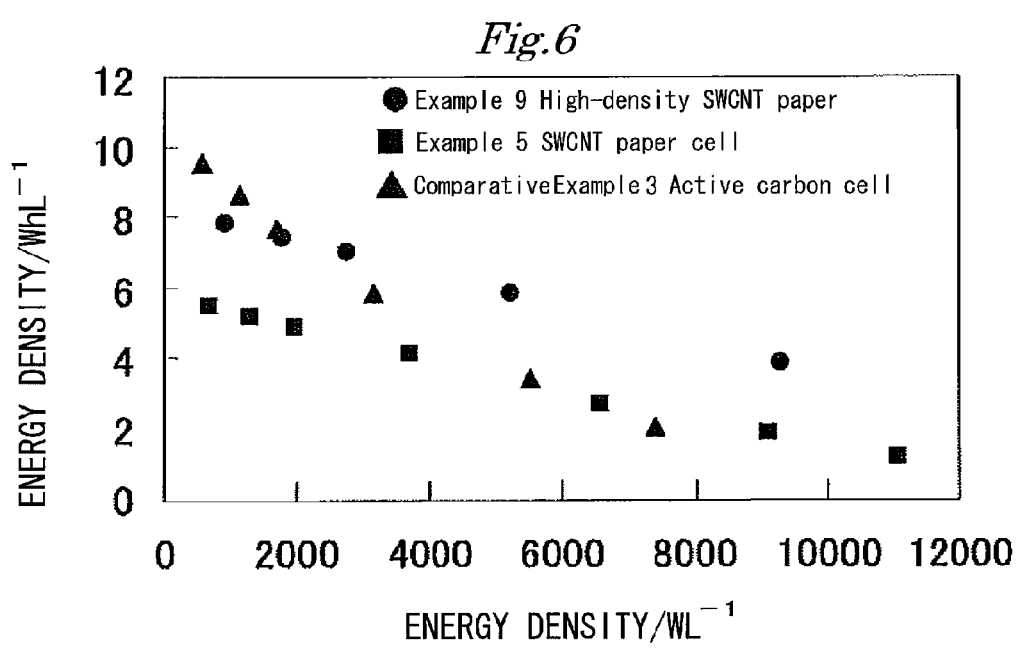
FIG. 6 is a graph of the energy density and power density relationships in Example 9, Example 5 and Comparative Example 3 of the Examples of the present invention.

The energy density and power density of the cells of Example 9, Example 5 and Comparative Example 3 above were measured with the results shown in FIG. 6. As shown in FIG. 6, the cell of Example 9 had much greater energy density and power density per unit area than the cell of Example 5. This is attributed to the higher density of the SWCNTs.

Example 10

High-density SWCNT sheets prepared by the method of Example 8 were press bonded after aluminum sputtering by the methods of Example 6 to obtain electrodes (high-density SWCNT paper-Al sputtered electrode). A cell for evaluation (high-density SWCNT paper-Al sputtered cell) was prepared as in Example 5 using these electrodes for both electrodes.

(Test Results)

The energy density and power density of the cells of Example 10, Example 9, Example 5 and Example 6 above were measured, with the results shown in FIG. 7. As shown in FIG. 7, the cell of Example 10 had much greater energy density and power density per unit area than the cell of Example 6. This shows that even higher power density can be obtained by press bonding high-density SWCNTs after aluminum sputtering.

[8. Other]

In the case of CNT structures the length and width can be controlled at will by patterning a catalyst during preparation, and a CNT electrode patterned in a specific shape can be obtained using CNT structures obtained by patterning a catalyst to a specific shape, which are then shrunk at a specific shrinkage rate.

It has been confirmed by Raman spectroscopy that there is no damage before and after bonding on CNTs on a CNT electrode prepared by the press bonding method of the present invention. That is, there was no change in the G/D ratio as calculated from the Raman spectra before and after bonding.

The invention claimed is:

1. An electrical double layer capacitor electrode, comprising a paper-molded sheet of carbon nanotubes integrated with a substrate constituting a collector, by means of bumps and indentations on the surface of the substrate.

2. The electrical double layer capacitor electrode according to claim 1, wherein a porous metal body is used as said substrate.

3. The electrical double layer capacitor electrode according to claim 1, wherein nickel foam is used as said substrate.

4. The electrical double layer capacitor electrode according to claim 1, wherein said substrate is made of aluminum.

5. The electrical double-layer capacitor electrode according to claim 1, wherein said paper-molded sheet of carbon nanotubes is a carbon nanotube aggregate with a density of 0.5 to 1.5 g/cm$^3$ obtained by depositing carbon nanotubes with high dispersion.

6. The electrical double-layer capacitor electrode according to claim 1, wherein aluminum is sputtered on the surface of at least the collector side of the sheet or substrate.

7. The electrical double layer capacitor electrode according to claim 1, wherein the bumps on the surface of the substrate are bent and pushed into the paper-molded sheet of carbon nanotubes to integrally connect the substrate to the paper-molded sheet of carbon nanotubes.

8. The electrical double layer capacitor electrode according to claim 1, wherein the substrate is an etched foil which has the bumps and the indentations formed by etching on the surface thereof.

9. The electrical double-layer capacitor electrode according to claim 1, wherein the paper-molded sheet of carbon nanotubes is made by molding the carbon nanotubes without using a binder.

\* \* \* \* \*